(12) United States Patent
Mason (10) Patent No.: US 12,366,748 B2
(45) Date of Patent: Jul. 22, 2025

(54) OPTICAL WAVEGUIDE

(71) Applicant: Snap Inc., Santa Monica, CA (US)

(72) Inventor: Stephen Mason, Rochester (GB)

(73) Assignee: Snap Inc., Santa Monica, CA (US)

(*) Notice: Subject to any disclaimer, the term of this patent is extended or adjusted under 35 U.S.C. 154(b) by 10 days.

(21) Appl. No.: 17/753,097

(22) PCT Filed: Aug. 20, 2020

(86) PCT No.: PCT/GB2020/051994
§ 371 (c)(1),
(2) Date: Feb. 18, 2022

(87) PCT Pub. No.: WO2021/032982
PCT Pub. Date: Feb. 25, 2021

(65) Prior Publication Data
US 2022/0269074 A1 Aug. 25, 2022

(30) Foreign Application Priority Data
Aug. 21, 2019 (GB) ...................................... 1911982
Nov. 28, 2019 (EP) ...................................... 19275135

(51) Int. Cl.
*G02B 27/01* (2006.01)
*F21V 8/00* (2006.01)
*G02B 27/00* (2006.01)

(52) U.S. Cl.
CPC ....... *G02B 27/0101* (2013.01); *G02B 6/0038* (2013.01); *G02B 6/0065* (2013.01); *G02B 27/0081* (2013.01); *G02B 2027/0123* (2013.01)

(58) Field of Classification Search
CPC ............ G02B 27/0101; G02B 27/0081; G02B 6/0038; G02B 6/0065; G02B 2027/0123
See application file for complete search history.

(56) References Cited

U.S. PATENT DOCUMENTS 4,978,187 A * 12/1990 Minemura ............. G11B 7/124
385/37
7,492,517 B2 * 2/2009 McGrew ............. G02B 5/3083
359/489.01
(Continued)

FOREIGN PATENT DOCUMENTS

BR 112022003104 5/2022
CL 202200409 2/2022
(Continued)

OTHER PUBLICATIONS

English language translation of JP-H10335211-A (Year: 1998).*
(Continued)

*Primary Examiner* — Peter Radkowski
(74) *Attorney, Agent, or Firm* — Schwegman Lundberg & Woessner, P.A.

(57) ABSTRACT

An optical waveguide for a head up display is disclosed. The optical waveguide is configured to provide pupil expansion in two dimensions and having an input end and an output end and a first axis substantially parallel to the direction of propagation of light in the waveguide and substantially parallel with a direction from the input end to the output end. The optical waveguide comprising: an input region at the input end; a beam splitter configured to expand light received from the input region; a symmetrical diffraction grating comprising complementary first and second grating portions, wherein the second grating portion is substantially symmetrical to the first grating portion along a line of symmetry that is substantially parallel to the first axis. Light received at the symmetrical diffraction grating from the beam splitter is configured to be diffracted by the symmetrical diffraction grating towards the line of symmetry by the first grating portion or the second grating portion. Light received at the first grating portion from the second waveguide portion is configured to be diffracted out of the
(Continued)

waveguide at the output end. Light received at the second grating portion from the first grating portion is configured to be diffracted out of the waveguide at the output end.

22 Claims, 7 Drawing Sheets

(56) References Cited

U.S. PATENT DOCUMENTS

| | | | |
|---|---|---|---|
| 7,907,342 B2 | 3/2011 | Simmonds et al. | |
| 8,107,023 B2* | 1/2012 | Simmonds | G02B 27/0103 349/5 |
| 8,314,993 B2* | 11/2012 | Levola | G02B 6/0016 359/569 |
| 8,340,151 B2* | 12/2012 | Liu | G02B 27/14 372/100 |
| 8,466,953 B2* | 6/2013 | Levola | G02B 27/0081 348/51 |
| 9,939,647 B2* | 4/2018 | Vallius | G02B 27/0081 |
| 10,108,014 B2* | 10/2018 | Vallius | G02B 27/0101 |
| 10,114,220 B2 | 10/2018 | Grey et al. | |
| 10,180,530 B2* | 1/2019 | Shin | G02B 30/33 |
| 10,281,726 B2* | 5/2019 | Vallius | G02B 6/0033 |
| 10,429,645 B2* | 10/2019 | Vallius | G02B 27/0172 |
| 10,684,482 B2* | 6/2020 | Geng | H04N 13/324 |
| 10,852,547 B2* | 12/2020 | Bhargava | G02B 27/0172 |
| 2007/0024975 A1* | 2/2007 | McGrew | G02B 27/4233 359/569 |
| 2008/0204876 A9* | 8/2008 | McGrew | G02B 27/4233 359/569 |
| 2010/0231693 A1* | 9/2010 | Levola | G02B 27/4272 348/51 |
| 2010/0232016 A1* | 9/2010 | Landa | G02B 5/1814 359/466 |
| 2010/0246003 A1* | 9/2010 | Simmonds | G02B 27/0172 359/567 |
| 2011/0096401 A1* | 4/2011 | Levola | G02B 27/0172 359/573 |
| 2012/0147471 A1* | 6/2012 | Liu | G02B 27/14 359/629 |
| 2017/0102543 A1* | 4/2017 | Vallius | G06T 19/006 |
| 2017/0131551 A1 | 5/2017 | Robbins et al. | |
| 2017/0168209 A1* | 6/2017 | Shin | G02B 6/0068 |
| 2017/0176747 A1* | 6/2017 | Vallius | G02B 6/3598 |
| 2017/0363871 A1* | 12/2017 | Vallius | G02B 6/0016 |
| 2018/0052501 A1* | 2/2018 | Jones, Jr. | G02B 6/0016 |
| 2018/0196263 A1* | 7/2018 | Vallius | G02B 27/0172 |
| 2018/0210205 A1 | 7/2018 | Grey et al. | |
| 2018/0284439 A1* | 10/2018 | Vallius | G02B 5/1842 |
| 2018/0292653 A1* | 10/2018 | Tervo | G02B 6/0016 |
| 2018/0292656 A1* | 10/2018 | Geng | H04N 13/344 |
| 2018/0348427 A1 | 12/2018 | Tervo | |
| 2019/0187474 A1* | 6/2019 | Bhargava | G02B 27/0081 |

FOREIGN PATENT DOCUMENTS

| | | | | |
|---|---|---|---|---|
| EP | 3828618 | | 6/2021 | |
| EP | 4018246 | | 6/2022 | |
| GB | 2529003 | A | 2/2016 | |
| GB | 2573611 | A | 11/2019 | |
| GB | 2529003 | | 8/2020 | |
| GB | 2587709 | | 4/2024 | |
| IL | 290760 | | 4/2022 | |
| JP | H10335211 | A * | 12/1998 | |
| KR | 20170039655 | | 4/2017 | |
| KR | 20220045988 | | 4/2022 | |
| WO | 2008148927 | A1 | 12/2008 | |
| WO | WO-2016046514 | A1 * | 3/2016 | A61B 3/113 |
| WO | WO-2017060665 | A1 * | 4/2017 | G02B 27/0081 |
| WO | 2018231754 | A1 | 12/2018 | |
| WO | WO-2019136476 | A1 * | 7/2019 | G02B 27/0101 |
| WO | 2019171038 | A1 | 9/2019 | |
| WO | 2021032982 | A1 | 2/2021 | |

OTHER PUBLICATIONS

Combined text and image of WO-2019136476-A1. (Year: 2019).*
Ding, Y., Yang, Q., Li, Y. et al. Waveguide-based augmented reality displays: perspectives and challenges. eLight 3, 24 (2023). https://doi.org/10.1186/s43593-023-00057-z (Year: 2023).*
Jiang et al., Single-step fabrication of diffraction gratings on hybrid sol-gel glass using holographic interference lithography, Optics Communications 185 (2000) 19-24. (Year: 2000).*
International Preliminary Report on Patentability received for PCT/GB2020/051994. Mail Date: Mar. 3, 2022. 9 pages.
"European Application Serial No. 19275135.2, Decision to Refuse mailed Jun. 10, 2021", 2 pgs.
"United Kingdom Application Serial No. 2012985.4, Examination Report mailed Feb. 2, 2021", 2 pgs.
"United Kingdom Application Serial No. 2012985.4, Response filed Aug. 3, 2021 to Examination Report mailed Feb. 2, 2021", 4 pgs.
"United Kingdom Application Serial No. 2012985.4, Examination Report mailed Oct. 7, 2021", 2 pgs.
"United Kingdom Application Serial No. 2012985.4, Response filed Feb. 3, 2022 to Examination Report mailed Oct. 7, 2021", 5 pgs.
"United Kingdom Application Serial No. 2012985.4, Subsequent Examination Report mailed Mar. 31, 2022", 2 pgs.
"European Application Serial No. 20761877.8, Response to Communication pursuant to Rules 161 and 162 filed Sep. 27, 2022", 10 pgs.
"United Kingdom Application Serial No. 2012985.4, Response filed Sep. 29, 2022 to Subsequent Examination Report mailed Mar. 31, 2022", 11 pgs.
"Israel Application Serial No. 290760, Notification Prior to Examination mailed Oct. 27, 2022", 2 pgs.
"Chilean Application Serial No. 202200409, Office Action mailed Dec. 27, 2022", 2 pgs.
International Search Report and Written Opinion received for PCT Application No. PCT/GB2020/051994. Mail date: Nov. 4, 2020. 11 pages.
GB Search Report under Section 17(5) received for GB Application No. GB1911982.5, dated Jan. 24, 2020. 3 pages.
Extended European Search Report received for EP Application No. 19275135.2, dated May 29, 2020. 10 pages.
"Chilean Application Serial No. 202200409, Office Action mailed Dec. 26, 2023", w/ English Machine Translation, 28 pgs.
"United Arab Emirates Application Serial No. P6000292/2022, Substantive Examination Report mailed Dec. 11, 2023", 8 pgs.
"United Kingdom Application Serial No. 2012985.4, Subsequent Examination Report mailed Apr. 4, 2023", 3 pgs.
"European Application Serial No. 20761877.8, Communication Pursuant to Article 94(3) EPC mailed Feb. 21, 2024", 6 pgs.
"Indian Application Serial No. 202217009071, First Examination Report mailed Apr. 23, 2024", 9 pgs.
"Chilean Application Serial No. 202200409, Examination Report mailed Jul. 3, 2024", w/ English Machine Translation, 44 pgs.
"Israeli Application Serial No. 290760, Office Action mailed Aug. 6, 2024", w/ English Translation, 4 pgs.
"Israeli Application Serial No. 290760, Response filed Aug. 25, 2024 to Office Action mailed Aug. 6, 2024", 12 pgs.
"Chilean Application Serial No. 202200409, Response filed Mar. 25, 2024 to Office Action mailed Dec. 26, 2023", w/ English claims, 28 pgs.
"Chilean Application Serial No. 202200409, Response filed Oct. 2, 2024 to Examination Report mailed Jul. 3, 2024", w/ English claims, 16 pgs.
"United Arab Emirates Application Serial No. P6000292 2022, Substantive Examination Report mailed Nov. 25, 2024", 9 pgs.
"Chilean Application Serial No. 202200409, Office Action mailed Jan. 16, 2025", w/ English machine translation, 6 pgs.
"Korean Application Serial No. 10-2022-7009393, Notice of Preliminary Rejection mailed Jan. 7, 2025", w/ English Translation, 13 pgs.

* cited by examiner

OPTICAL WAVEGUIDE

CLAIM OF PRIORITY

This application is a U.S. national-phase application filed under 35 U.S.C. § 371 from International Application Serial No. PCT/GB2020/051994, filed on 20 Aug. 2020, and published as WO 2021/032982 on 25 Feb. 2021, which claims the benefit of priority to GB Patent Application Serial No. 1911982.5, filed on 21 Aug. 2019, and EP patent application Ser. No. 19275135.2, filed on 28 Nov. 2019, each of which is incorporated herein by reference in its entirety.

BACKGROUND

The transparent component of a head up display (HUD) is typically mounted in a fixed position on equipment being used by a user (for example the cockpit of an aircraft), but may also be mounted on the head of the user (for example as a pair of spectacles, or on a helmet) such that the component moves with the user's head and thus remains at a fixed location in relation to the user's eye.

To allow for flexibility in the alignment of the user's eye with the device, the exit pupil of the HUD should be large enough to accommodate likely positions of the user's eye in use. The waveguide system may be designed to expand the input pupil such that the exit pupil is larger than the input pupil. This expansion is commonly known as pupil replication. The expansion should be performed while preserving the far field and maintaining a constant luminance across the near field.

Gaps or irregular luminance between replicated pupils leads to non-uniformities in the output display, causing changes in perceived brightness in the far field and if the user's eye moves relative to the display. Providing expansion in two-dimensions without utilising an impractically sized waveguide can be challenging. Furthermore as the expansion ratio increases the luminance for each pupil decreases, thus reducing the perceived brightness for a given source brightness.

HUDs based on waveguide optics may provide reductions in mass and volume compared to conventional optics, such as lenses and prisms, allowing the safety advantages of HUDs to be extended to aircraft that may not have sufficient space to accommodate a conventional HUD.

Previous waveguide designs for HUD applications have been asymmetrical, leading to an asymmetric field of view, which may require different designs for left and right seat installations.

DETAILED DESCRIPTION

Figure 1:
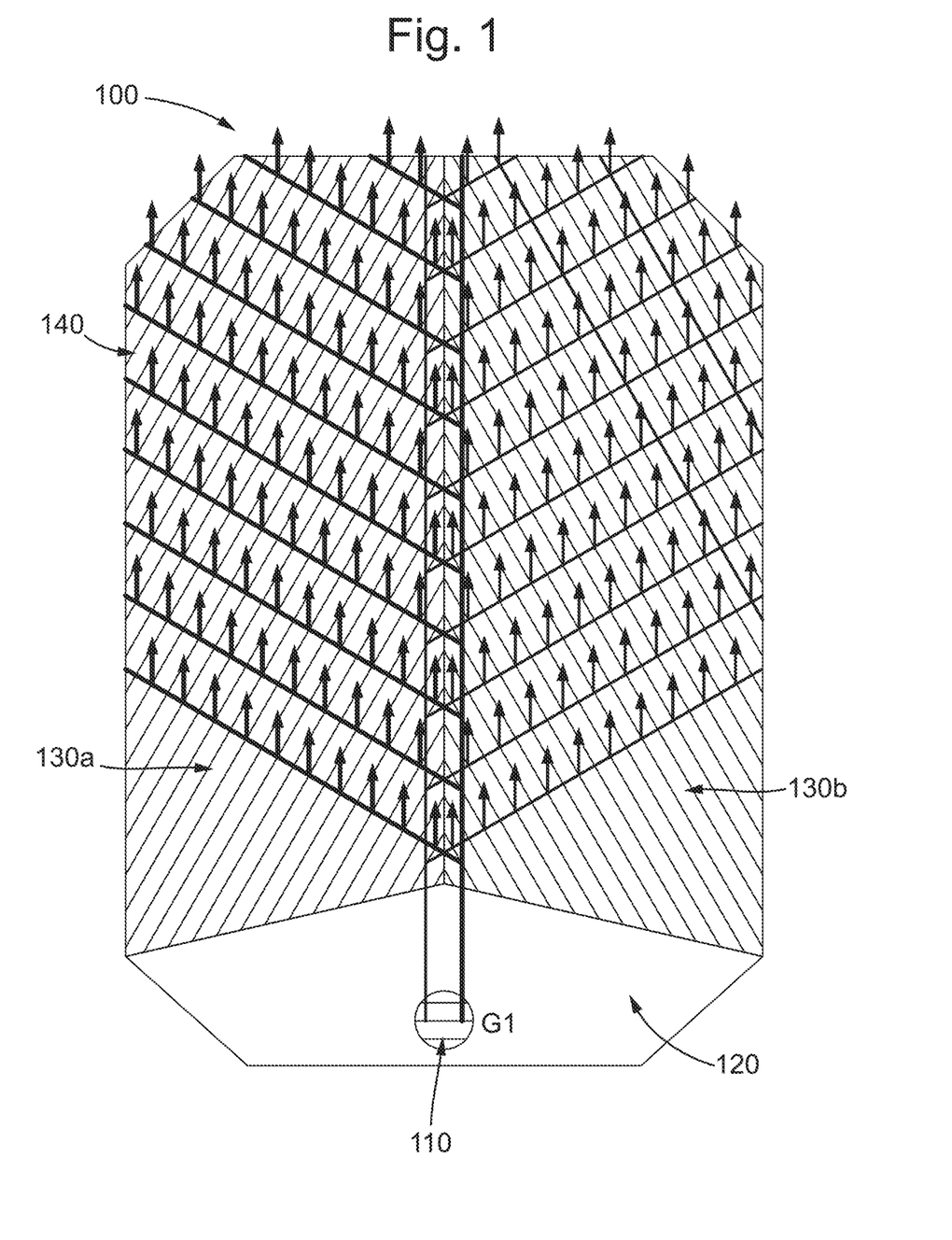
FIG. 1 illustrates a waveguide comprising a single input region.

FIG. 1 illustrates a single-input waveguide 100 for use with HUD applications in accordance with some examples. The single-input waveguide 100 comprises an input end 110, a beam-splitter 120, and a symmetrical diffraction grating 130 comprising complementary first diffraction portion 130a and complementary second diffraction grating 130b. Single-input waveguide 100 also comprises an output region 140.

The input end is configured to receive and couple light through a single input region 110 into the single-input waveguide 100. The light then passes through beam-splitter 120 which in combination with the symmetrical diffraction grating 130 expands the pupil. Light received from the beam-splitter 120 at the symmetrical diffraction grating is weakly diffracted towards a centre axis of the symmetrical diffraction grating, more specifically light received at complementary first diffraction portion 130a from beam splitter 120 is weakly diffracted towards a centre axis of the symmetrical diffraction grating and light received at the complementary second diffraction portion 130b is diffracted towards the centre axis.

As shown in FIG. 1 wherein the first diffraction portion 130a has periodicity along a first direction and the second diffraction portion 130b has a periodicity along a second direction. The angle formed between the first direction and second direction is oblique. In some examples the first diffraction portion 130a may comprise grooves or lines in a first direction and the second diffraction portion 130b may comprise grooves or lines in a second direction.

The centre axis may be defined as an axis that is substantially central to the waveguide 100 and substantially parallel to a direction defined by the direction between the input region 110 and the output region 140. The light in the waveguide may propagate in a direction substantially along the centre axis.

Light received at complementary first diffraction portion 130a from complementary second diffraction portion 130b is diffracted out of the waveguide towards the eye of the user of the HUD. Light received at complementary second diffraction portion 130b from complementary first diffraction portion 130a is diffracted out of the waveguide towards the eye of the user of the HUD.

The amount of diffraction may be chosen such that the size of the exit pupil is sufficient for the design of the application, such as a HUD. Stronger diffraction would cause light to be diffracted out of the waveguide in a shorter distance, and therefore would lead to a smaller and brighter exit pupil.

The single-input waveguide 100 allows the advantages of a symmetrical waveguide to be realised whilst reducing the complexity of the display as there is no requirement to use multiple projectors. The complexity of the single-input waveguide 100 is also reduced compared to previous waveguides as a lower number of diffraction gratings are required, therefore the waveguide can be fabricated with fewer processing steps, which both reduces cost and time of fabrication.

In some examples the single input region 110 may comprise a diffraction grating which causes the input light to undergo total internal reflection inside the waveguide to couple light into the single input waveguide 100.

Figure 2:
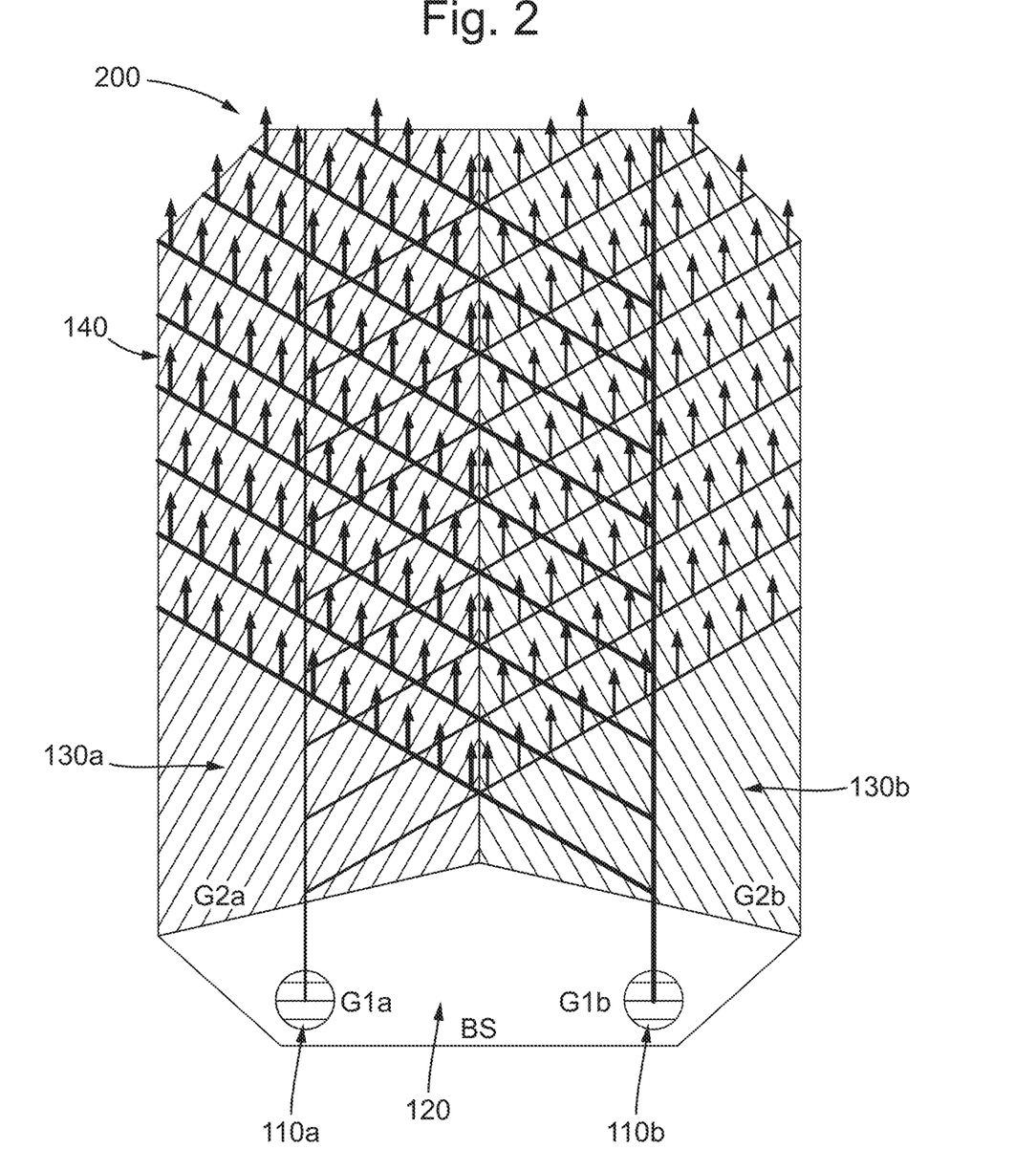
FIG. 2 illustrates a waveguide comprising two spatially separate input regions.

FIG. 2 illustrates a dual-input waveguide 200 in accordance with some examples. Dual-input waveguide 200 is substantially similar to single-input waveguide 100, except that dual-input waveguide comprises an input end comprising a first input region 110a and a second input region 110b, wherein the first input region 110a and second input region 110b are spatially separate.

The dual-input waveguide 200 may have improved pupil banding in comparison with the single-input waveguide 100. The dual-input waveguide has similar advantages over previous waveguide designs as the single-input design because it also has a lower number of diffraction gratings compared to previous designs.

As shown in FIG. 2 wherein the first diffraction portion 130a has periodicity along a first direction and the second diffraction portion 130b has a periodicity along a second direction. The angle formed between the first direction and second direction is oblique. In some examples the first diffraction portion 130a may comprise grooves or lines in a orientated perpendicular to a first direction and the second diffraction portion 130b may comprise grooves or lines orientated perpendicular to a second direction.

Figure 3:
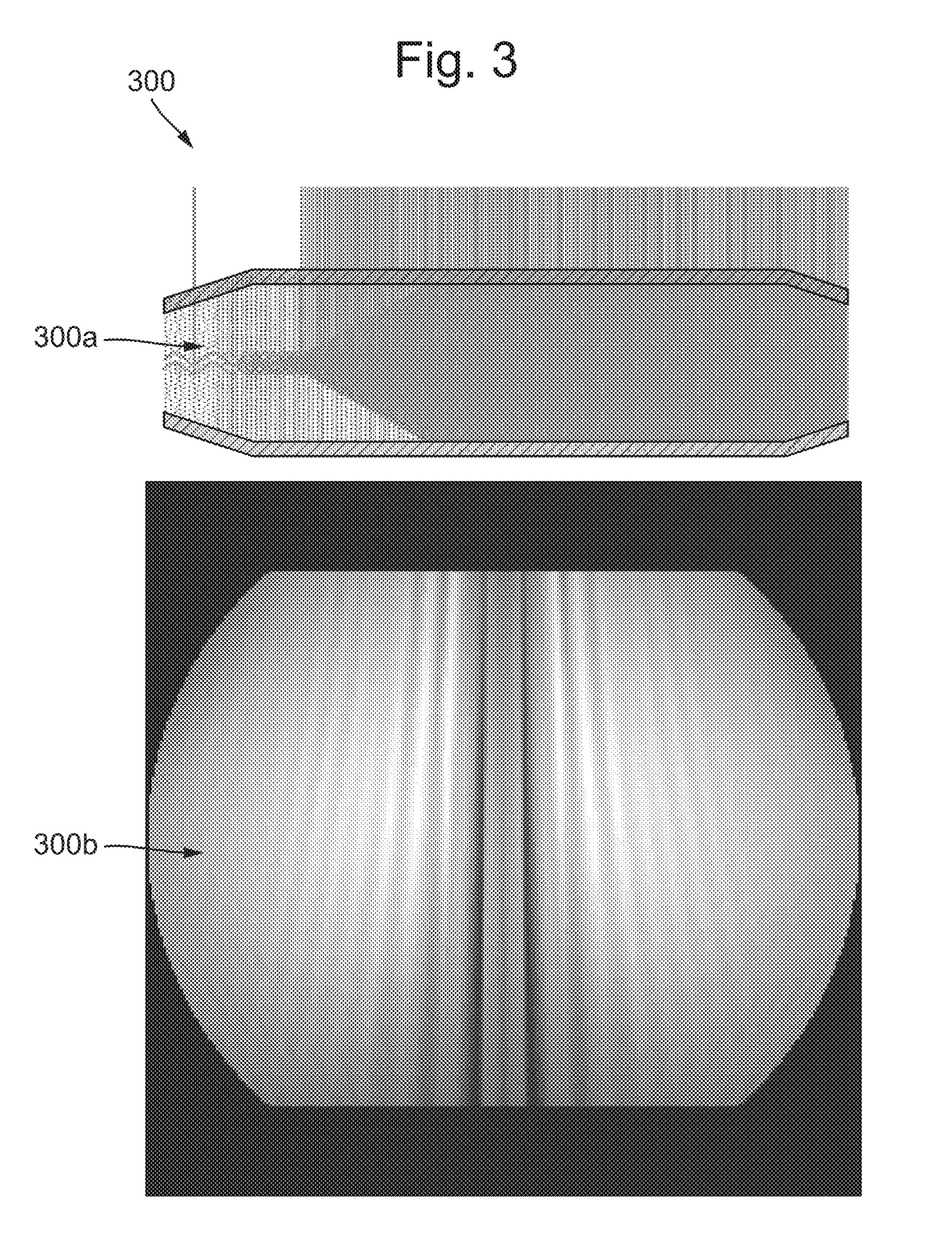
FIG. 3 illustrates a model of an output from a waveguide comprising a single input region.
Figure 4:
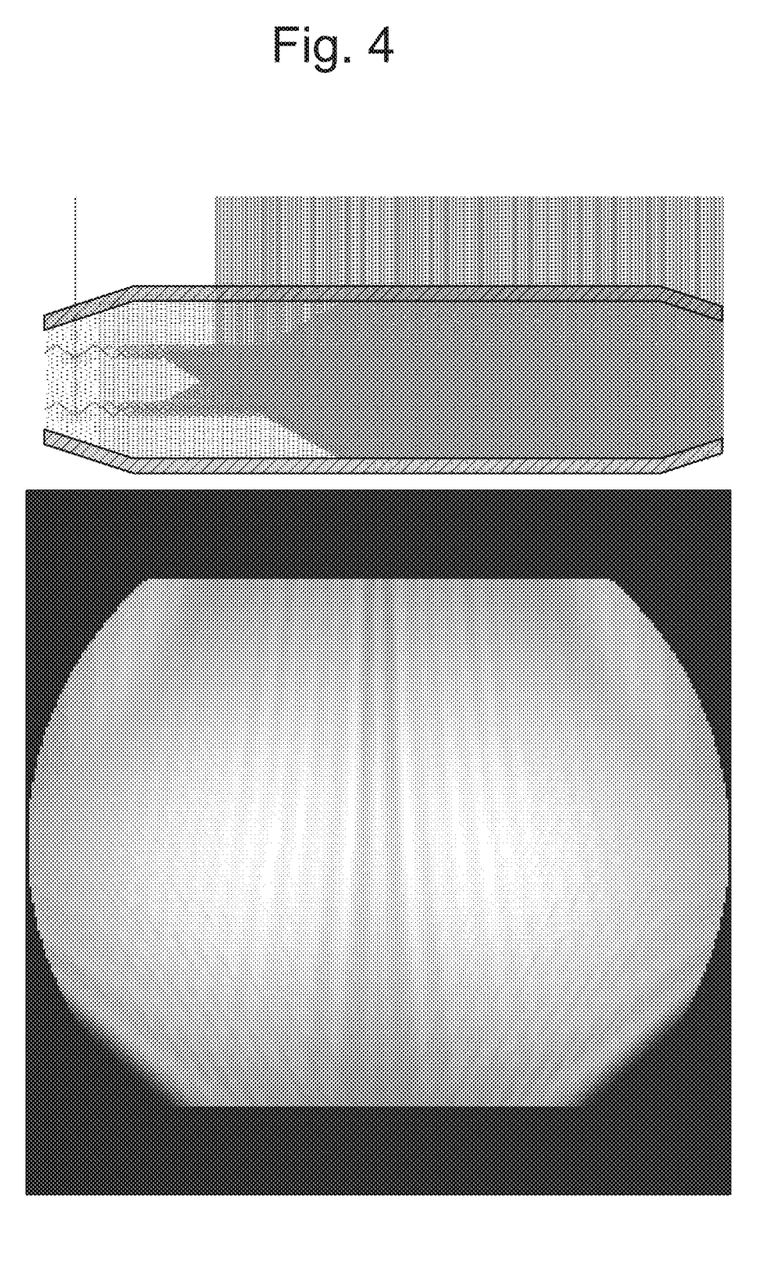
FIG. 4 illustrates a model of an output of a waveguide comprising two spatially separate input regions spaced at a first spacing.
Figure 5:
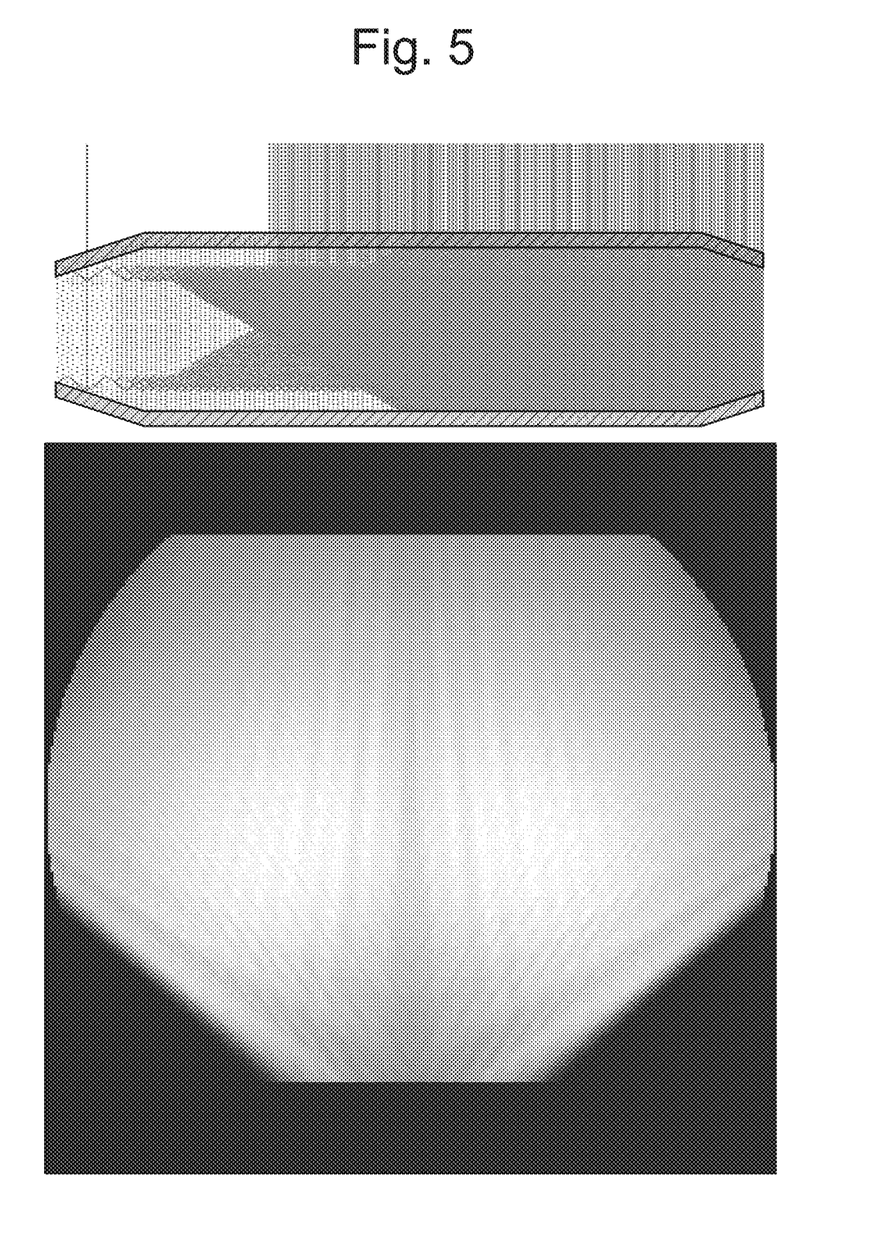
FIG. 5 illustrates a model of an output of a waveguide comprising two separate input regions spaced at a second spacing.

FIGS. 3-5 illustrate different models of operation of both single-input waveguides and dual input waveguides. The waveguides modelled are 230 mm long and 180 mm wide which represents a reduction in size of the waveguide compared to previous designs giving a similar output pupil.

FIG. 3 illustrates a model of a single-input waveguide substantially similar to the single-input waveguide 100 described in relation to FIG. 1. Pattern 300a illustrates a view of the both the input end and the output region of the waveguide. Pattern 3b illustrates the output from the waveguide. As can be seen there is some pupil banding, and therefore this particular setup of a single-input waveguide may not be ideal for a HUD system, however it may still be effective in applications where the eye is close to the waveguide. If they eye is close to the waveguide the pupil banding is less objectionable to the user.

FIG. 4 illustrates a model of a dual-input waveguide substantially similar to the dual-input waveguide 200 described in relation to FIG. 2. The dual input regions in the design of FIG. 4 are spaced +/−30 mm apart from the central axis (such that the total spacing between the input regions is 60 mm). As can be seen compared to FIG. 3 the pupil banding is reduced.

FIG. 5 illustrates a model of a dual-input waveguide substantially similar to the dual-input waveguide 200 described in relation to FIG. 2. The dual input regions in the design of FIG. 4 are spaced +/−55 mm apart from the central axis (such that the total spacing between the input regions is 110 mm). As can be seen compared to FIGS. 3 and 4 the pupil banding is further reduced.

Figure 6:
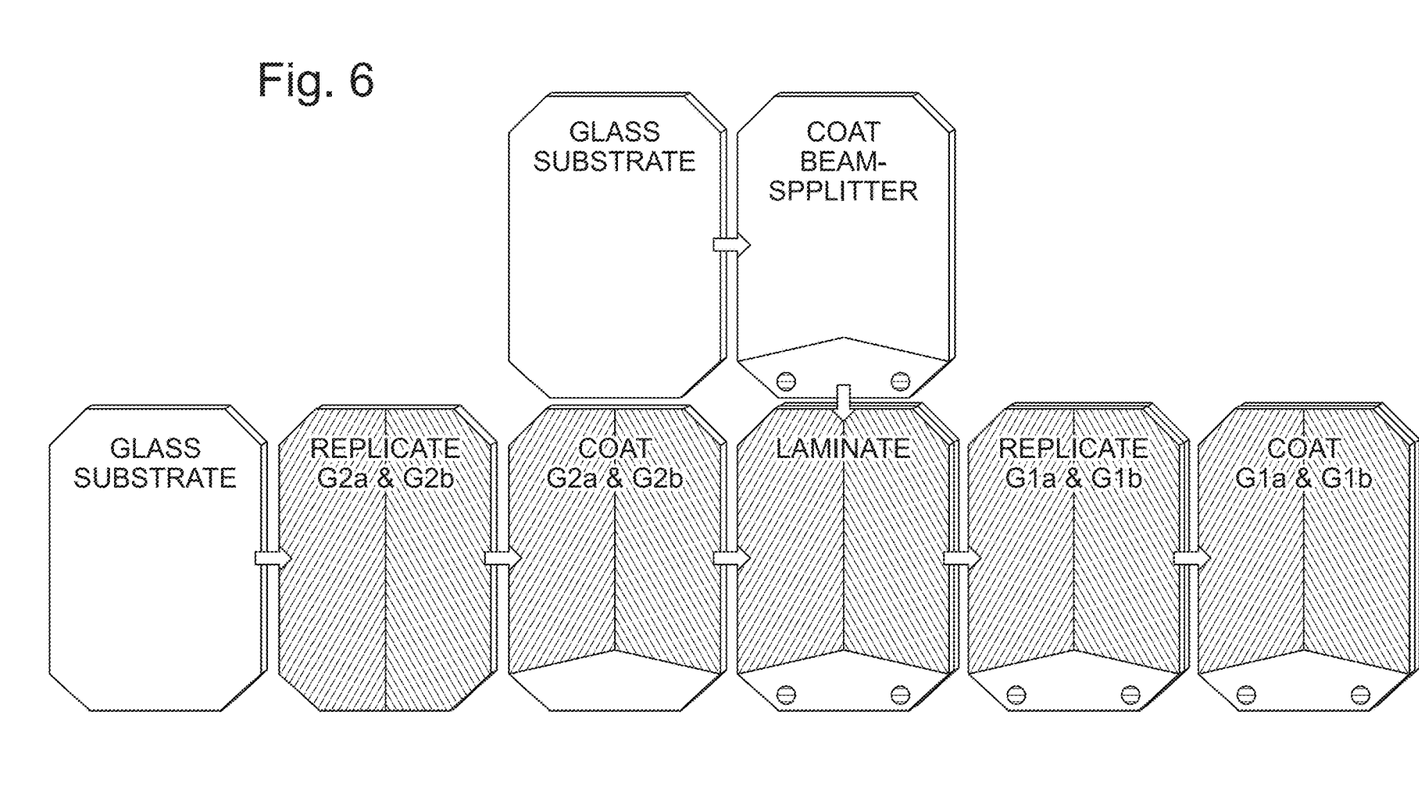
FIG. 6 illustrates different stages of a method to fabricate a waveguide according to some examples.
Figure 7:
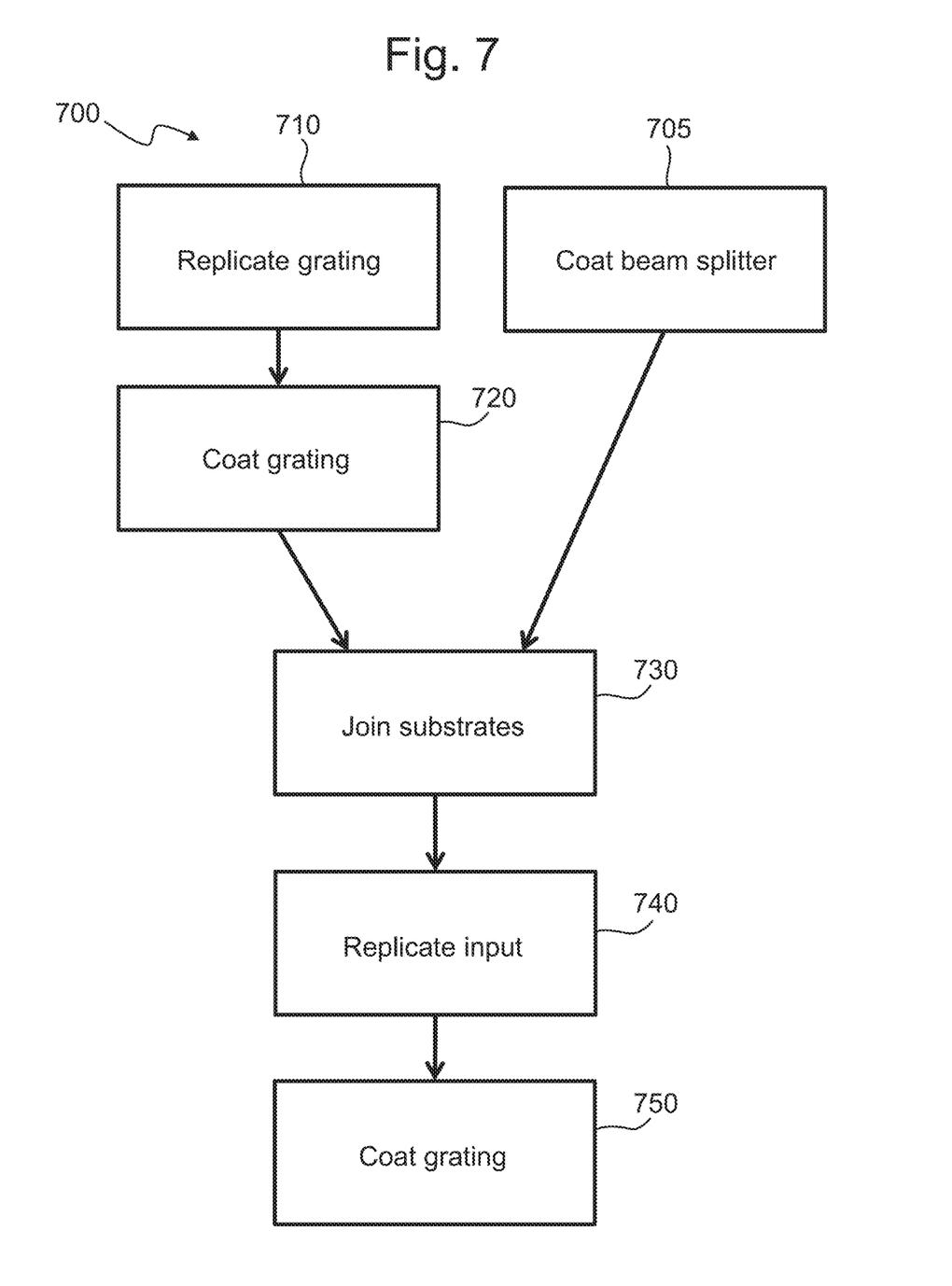
FIG. 7 illustrates a method to fabricate a method to fabricate a waveguide according to some examples.

FIG. 6 in combination with FIG. 7 illustrates a waveguide fabrication method 700 in accordance with some examples. The waveguide may be formed by fabricating components on separate substrates, and then joining the substrates together. A beam splitter may be formed on a first substrate 705. The symmetrical diffraction grating pattern comprising a first complementary diffraction pattern and a second complementary diffraction pattern may be formed on a second substrate 710 and then coated 720. The first substrate comprising the beam splitter and the second substrate comprising the symmetrical diffraction pattern may then be joined together 730, for example using a lamination process. The input region may then be formed 740 and coated onto the waveguide 750.

The waveguide fabrication method allows the symmetrical diffraction grating pattern to be formed using a single process step not requiring separate steps to form different aspects of the pattern. In some examples, the symmetrical diffraction grating pattern may be formed by a single imprint process, or by a single photolithography process, although it is not limited to these processes.

Although the present invention has been described in connection with some examples, it is not intended to be limited to the specific form set forth herein. Rather, the scope of the present invention is limited only by the accompanying claims. Additionally, although a feature may appear to be described in connection with particular examples, one skilled in the art would recognize that various features of the described examples may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical waveguide for a head up display, the waveguide configured to provide pupil expansion in two dimensions and having an input end and an output end and an axis substantially parallel to a direction of propagation of light in the optical waveguide and substantially parallel with a direction from the input end to the output end, the optical waveguide comprising:
   an input region at the input end;
   a beam splitter; and
   a symmetrical diffraction grating comprising a complementary first grating portion and second grating portion, wherein the second grating portion is substantially symmetrical to the first grating portion along a line of symmetry that is substantially parallel to the axis;
   wherein each of the first grating portion and the second grating portion is configured to diffract light received at the symmetrical diffraction grating from the beam splitter towards and across the central line of symmetry to the other grating portion such that light received at the symmetrical diffraction grating from the beam splitter is to be diffracted by the symmetrical diffraction grating towards the line of symmetry by at least one grating portion selected from the first grating portion and the second grating portion;
   wherein light received at the first grating portion from the second grating portion is to be diffracted out of the waveguide at the output end;
   wherein light received at the second grating portion from the first grating portion is to be diffracted out of the waveguide at the output end; and
   wherein the beam splitter and the symmetrical diffraction grating are configured to expand light received from the input region.

2. The waveguide according to claim 1, wherein the first grating portion has periodicity along a first direction and the second grating portion has a periodicity along a second direction, wherein an angle formed between the first direction and the second direction is oblique.

3. The waveguide according to claim 1, wherein light is configured to travel in a direct optical path between the beam splitter, the first grating portion, and the second grating portion.

4. The waveguide according to claim 1, wherein a period of at least one of the first grating portion and the second grating portion is substantially constant in a direction in the axis.

5. The waveguide according to claim 1, wherein the waveguide comprises no more than one beam splitter.

6. The waveguide according to claim 1, wherein the symmetrical diffraction grating comprises no more than two gratings.

7. The waveguide according to claim 1, wherein the symmetrical diffraction grating comprises no more than two parts.

8. The waveguide according to claim 1, wherein the input region comprises no more than one input region.

9. The waveguide according to claim 1, wherein the waveguide comprises two spatially distinct input regions.

10. The waveguide according to claim 1, wherein the symmetrical diffraction grating comprises no more than two grating angles.

11. The waveguide according to claim 1, wherein the beam splitter and the symmetrical diffraction grating are each configured to expand light in a direction that is substantially parallel to the axis.

12. A method to fabricate a waveguide configured to provide pupil expansion in two dimensions and having an input end and an output end and an axis substantially parallel to a direction of propagation of light in the waveguide and substantially parallel with a direction from the input end to the output end, the method comprising:
    forming a symmetrical diffraction grating on a first substrate, the symmetrical diffraction grating comprising a first grating portion and a second grating portion, wherein the second grating portion is substantially symmetrical to the first grating portion along a line of symmetry that is substantially parallel to a first axis;
    forming a beam splitter on a second substrate;
    joining the first substrate and the second substrate; and
    forming an input region on at least one substrate selected from the first and the second substrate;
    wherein each of the first grating portion and the second grating portion is configured to diffract light received at the symmetrical diffraction grating from the beam splitter towards and across the central line of symmetry to the other grating portion such that light received at the symmetrical diffraction grating from the beam splitter is to be diffracted by the symmetrical diffraction grating towards the line of symmetry by the first grating portion or the second grating portion;
    wherein light received at the first grating portion from the second grating portion is to be diffracted out of the waveguide at the output end;
    wherein light received at the second grating portion from the first grating portion is to be diffracted out of the waveguide at the output end; and
    wherein the beam splitter and the symmetrical diffraction grating are each configured to expand light received from the input region.

13. The method according to claim 12, wherein a pattern of the symmetrical diffraction grating is formed using not more than a single process step.

14. A head up display comprising a waveguide according to claim 1.

15. An optical waveguide, comprising:
    an input end and an output end, and an axis substantially parallel to a direction of propagation of light in the waveguide and substantially parallel with a direction from the input end to the output end;
    an input region at the input end;
    a beam splitter; and
    a symmetrical diffraction grating comprising complementary first and second grating portions, wherein the second grating portion is substantially symmetrical to the first grating portion along a line of symmetry that is substantially parallel to the axis;
    wherein each of the first grating portion and the second grating portion is configured to diffract light received at the symmetrical diffraction grating from the beam splitter towards and across the central line of symmetry to the other grating portion such that light received at the symmetrical diffraction grating from the beam splitter is to be diffracted by the symmetrical diffraction grating towards the line of symmetry by at least one grating portion selected from the first grating portion and the second grating portion;
    wherein light received at the first grating portion from the second grating portion is to be diffracted out of the waveguide at the output end;
    wherein light received at the second grating portion from the first grating portion is to be diffracted out of the waveguide at the output end; and
    wherein the beam splitter and the symmetrical diffraction grating are configured to expand light received from the input region in a direction that is substantially parallel to the axis.

16. The waveguide according to claim 15, wherein the first grating portion has a periodicity along a first direction and the second grating portion has a periodicity along a second direction, wherein an angle formed between the first direction and the second direction is oblique.

17. The waveguide according to claim 15, wherein light is configured to travel in a direct optical path between the beam splitter, the first grating portion, and the second grating portion.

18. The waveguide according to claim 15, wherein a period of at least one of the first grating portion and the second grating portion is substantially constant in a direction in the axis.

19. The waveguide according to claim 15, wherein the waveguide comprises no more than one beam splitter.

20. A head up display comprising a waveguide according to claim 15.

21. The waveguide according to claim 15, wherein the symmetrical diffraction grating comprises no more than two gratings.

22. The waveguide according to claim 15, wherein the symmetrical diffraction grating comprises no more than two grating angles.

* * * * *